United States Patent [19]

Tyson, II

[11] Patent Number: 5,091,776
[45] Date of Patent: Feb. 25, 1992

[54] APPARATUS AND METHOD FOR ENHANCING THE QUALITY OF A VIDEO SIGNAL PRODUCED BY ELECTRONIC SHEAROGRAPHY

[75] Inventor: John Tyson, II, Wayne, Pa.
[73] Assignee: Laser Technology, Inc., Norristown, Pa.
[21] Appl. No.: 611,889
[22] Filed: Nov. 8, 1990
[51] Int. Cl.⁵ ............................................. H04N 7/18
[52] U.S. Cl. .................................. 358/93; 358/107; 356/35.5; 356/353
[58] Field of Search ................ 358/93, 107; 356/35.5, 356/353

[56] References Cited

U.S. PATENT DOCUMENTS

| | | | |
|---|---|---|---|
| 4,620,223 | 10/1986 | Haskell et al. | 358/93 |
| 4,680,574 | 7/1987 | Ruffner | 340/571 |
| 4,887,899 | 12/1989 | Hung | 356/35.5 |
| 5,011,280 | 4/1991 | Hung | 358/35.5 |

Primary Examiner—John K. Peng
Attorney, Agent, or Firm—William H. Eilberg

[57] ABSTRACT

The purpose of the present invention is to improve the quality of a video signal generated by the method of nondestructive testing known as electronic shearography. In electronic shearography, two laterally-displaced images of a test object are made to interfere, and the interference pattern is stored. Another such interference pattern is obtained while the object is stressed. The two patterns are compared by computer, such as by subtracting one pattern from the other, and the resulting composite pattern is displayed on a video monitor or equivalent. According to the present invention, the subtracted signal is connected to a rectifier circuit which causes both positive-going and negative-going variations in the video signal to become positive-going variations. Thus, any changes in the intensity of the signal, due to phase changes resulting from deformation of the object, are displayed as increases in brightness of a pixel on the final display. If a point on the object has not moved due to the applied stress, the pixels representing that point remain dark. The present invention therefore produces an image having a greater resolution than is possible using the methods of the prior art.

17 Claims, 5 Drawing Sheets

FIG. 1

PRIOR ART

APPARATUS AND METHOD FOR ENHANCING THE QUALITY OF A VIDEO SIGNAL PRODUCED BY ELECTRONIC SHEAROGRAPHY

BACKGROUND OF THE INVENTION

This invention relates to the field of nondestructive testing, and especially the technique of electronic shearography. The invention comprises an improvement in the electronic circuitry used in shearography.

In the technique of shearing interferometry, or "shearography", two laterally-displaced images of the same object are made to interfere to form an interference pattern called a shearogram. The term "shearing" is used because of the lateral displacement of the interfering images. A first shearogram is taken while the object is in an unstressed condition, and another shearogram is taken when the object is stressed. Comparison of the two shearograms reveals information about the strain concentrations (and hence the integrity) of the object.

In the technique called "electronic shearography", the shearograms are stored in a computer memory, and are compared electronically to produce a composite pattern. Because all the data are processed electronically, the results of the analysis can be viewed in "real time".

U.S. Pat. No. 4,887,899 describes an apparatus and method for performing electronic shearography. In the apparatus shown in the cited patent, a shearogram is produced by passing light, reflected from the test object, through a birefringent material and a polarizer. The birefringent material, which can be a calcite crystal, splits a light ray, reflected from a point on the object, into two rays, and the polarizer makes it possible for these rays to interfere with each other. Thus, each point on the object generates two rays, and the result is a shearogram, i.e. an interference pattern formed by the optical interference of two laterally-displaced images of the same object.

It turns out that the spatial frequency of the shearogram produced with this arrangement is relatively low, because the effective angles between the interfering rays are small. Thus, the shearograms can be recorded by a video camera, which normally has much less resolving capability than a high-density photographic film. By storing the shearogram of the object in its initial, unstressed condition, and by comparing that shearogram, virtually instantaneously, by computer, with further shearograms taken under varying levels of stress, a "real time" image of the resultant strains on the object can be observed.

The above-described method can be practiced by storing the shearograms in separate frame buffers, and by using a real-time video subtractor to perform the comparison. Other methods of comparing the stored shearograms can also be used, as described in the above-cited patent. The amplified output of the subtractor is what is observed on a video display.

Each point on the actual shearogram is generated by the interference of light emanating from a pair of distinct points on the object. Thus, each pixel of the video camera is illuminated by light reflected from those two points. If the overall illumination remains constant, then any variations in the pixel intensity, in the shearogram, will be due only to changes in the phase relationship of the two points of light.

When the initial video image is stored, an initial intensity for each pixel is recorded, as described above. If any differential deformations occur in the object, such deformations will cause changes in the subsequent shearogram. In particular, the intensity of a given pixel will have changed according to the change in the phase relationship between the two rays of light (reflected from two points on the object) which illuminate the pixel. These phase differences can be either positive changes, causing the pixel to become brighter, or negative changes, causing the pixel to become darker. Whether the pixel becomes brighter or darker depends on the initial phase relationship and the direction of the change of phase. Due to the cyclic nature of phase interference, as the deformation of the object continually increases, the intensity at a given pixel will pass through a complete cycle. That is, the intensity at the pixel might increase to a maximum (positive) difference, then return to the original intensity, and then continue to a maximum (negative) difference, and so on.

In the systems of the prior art, only the positive-going variations appearing at the output of the subtractor (or other means of comparison) have been amplified. Thus, in the prior art, the negative-going changes are lost. That is, essentially half of the collected data are lost. The present invention provides an apparatus and method which avoids this waste of data, and thereby greatly improves the resolution of images obtained from electronic shearography.

SUMMARY OF THE INVENTION

In the present invention, a rectifier circuit is placed between the subtraction (or other comparison) circuit in an electronic shearography apparatus, and the amplifier which drives the video display. The rectifier causes all changes in the video signal to go positive. Thus, if the video signal has changed due to deformation of a point on the test object, then the corresponding pixel on the video monitor will be brighter than black, its brightness being proportional to the absolute value of change in the video signal. If the video signal has not changed due to deformation of the given point, then the corresponding pixel on the video monitor will remain black.

The video sync signals are adjusted such that when the input video signal is zero, i.e. when there is no change, between the two shearograms, at a given pixel, the pixel is displayed as black. Thus, all deviations from exact equality of corresponding pixels of different shearograms will be shown, in the final display, as varying levels of brightness, in a range from black to white.

The present invention can be practiced by one of three possible methods. Two of these methods are implemented in hardware. In the first hardware method, the rectifier is an analog circuit comprising a fullwave rectifier. In the second hardware method, the rectifier has a binary (but analog) output. In the latter case, whenever the input pixel represents no change between the shearograms, the output of the rectifier is "zero". When there is some change between the shearograms, the output of the rectifier is "one".

The third method of practicing the invention is to implement one or the other of the above techniques by software.

It is therefore an object of the invention to improve the resolution of an image obtained by electronic shearography.

It is another object to cause all changes in pixel intensity, due to stress on a test object, whether those changes are positive or negative, to be displayed on a video screen.

It is another object to improve the efficiency of electronic shearography.

It is another object to provide various means of enhancing the quality of a video signal produced by electronic shearography, wherein these means can be chosen according to the manner of deformation of the test object.

Other objects and advantages of the invention will be apparent to those skilled in the art, from a reading of the following brief description of the drawings, the detailed description of the invention, and the appended claims.

DETAILED DESCRIPTION OF THE INVENTION

Before explaining the details of the present invention, it is helpful to review the basic concepts of electronic shearography. More details of electronic shearography are given in U.S. Pat. No. 4,887,899, the disclosure of which is incorporated by reference herein.

Figure 1:
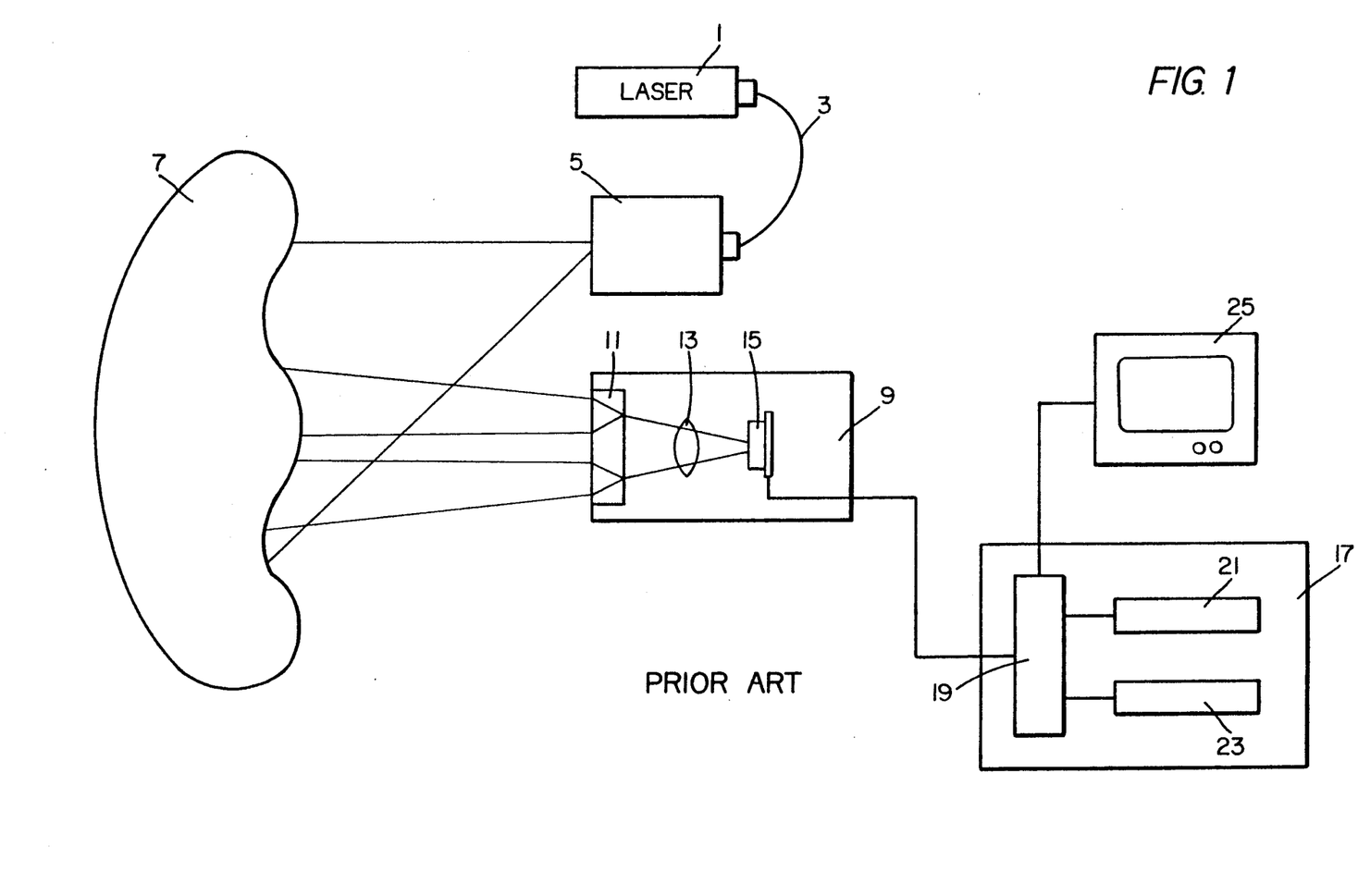
FIG. 1 is a schematic diagram showing an apparatus for practicing electronic shearography, and illustrates the context in which the present invention is used.

FIG. 1 is a block diagram showing an arrangement for practicing electronic shearography. Coherent light from laser 1 is directed through fiber optic cable 3 to an illuminator 5, which directs the light onto test object 7. Light is reflected from the object and into shearography camera 9, which includes an optical element 11 for generating a sheared image, a lens 13 for focusing the light, and a video detector 15 (which can be a charge-coupled device, or other photosensitive detection means). In the above-cited patent, the optical element includes a birefringent material and a polarizer, but the present invention is not necessarily limited to the latter type of optical element.

The output of video detector 15 is connected to an image processor 17. The image processor includes a computer 19, and the computer is connected to memory buffers 21 and 23. The buffers can be part of the memory of the computer, and are sufficiently large to be able to store an entire image obtained from detector 15. The computer is also connected to video monitor 25.

In operation, coherent light is reflected from the test object, and two laterally-displaced, or "sheared", images are formed on the video detector 15 of camera 9. These images interfere to form a pattern known as a shearogram. The first shearogram is normally taken while the object is in an unstressed condition, and is digitized and stored in buffer 21. Then, the object is stressed, such as by applying pressure or vacuum, or by other means. Another shearogram is taken in the same way, and the result is stored in buffer 23. The images stored in buffers 21 and 23 are then compared, in the computer. This comparison step typically comprises subtracting one image from the other, but other means of comparison, such as those described in the cited patent, can be used. The result of the subtraction, or other comparison, forms a composite pattern which is displayed on the monitor.

Because the steps are performed with the aid of a computer, the process can be performed in "real time". In particular, one can take repeated shearograms of the object, under varying conditions of stress, and continually compare the most recently obtained shearogram with the initial shearogram, which was taken while the object was not stressed. The result, seen on the monitor, is a "real time" image of the object, showing changes in the object which result from the deformation.

The summary given above is not intended to limit the invention to use with systems exactly as described. Many variations can be made. For example, the particular optical element can be changed, and the manner of directing coherent light onto the object can be different. Also, it is understood that the term "subtraction", when used in this specification to describe the comparison of shearograms, is also meant to include any other methods of comparison.

Figure 4:
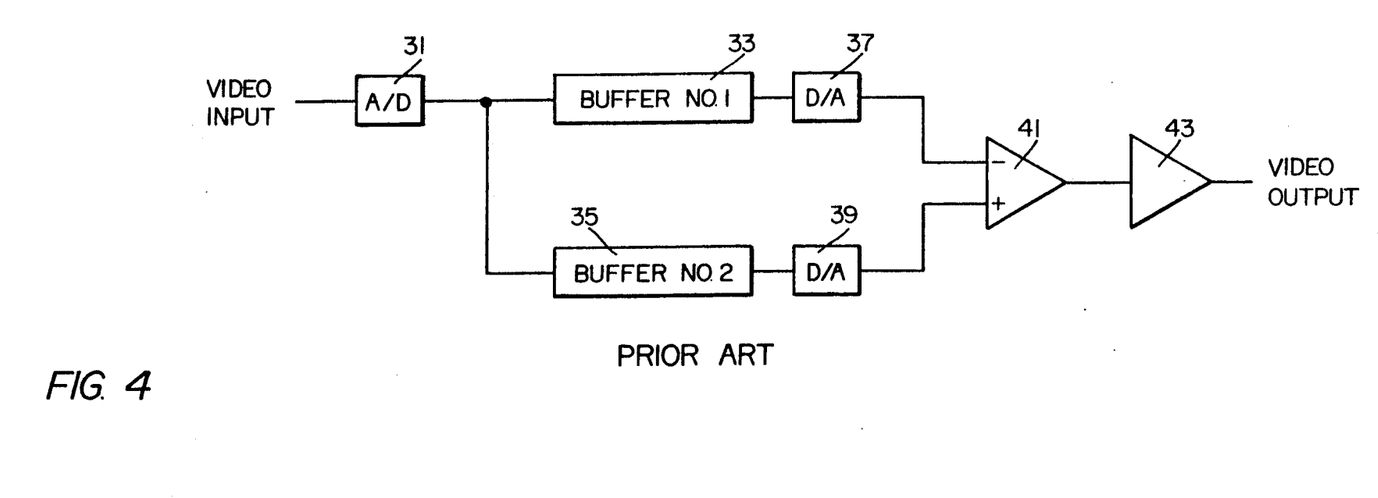
FIG. 4 is a block diagram of a circuit of the prior art, the circuit being used to compare two shearograms and to provide a video signal representing the results of the comparison.
Figure 5:
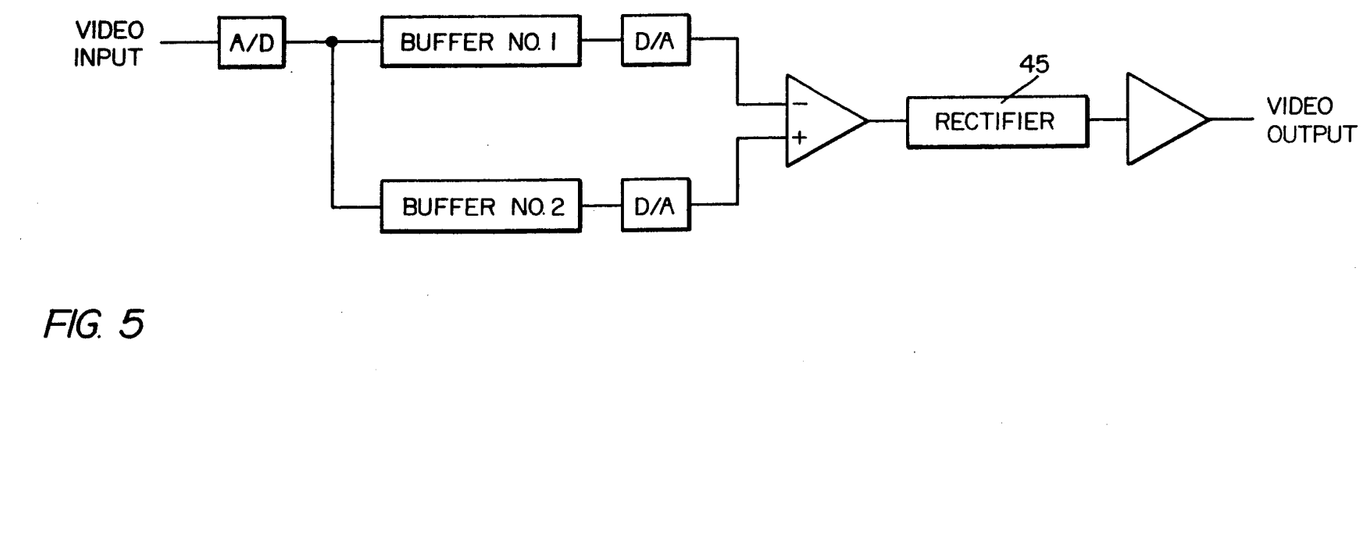
FIG. 5 is a block diagram similar to FIG. 4, showing the inclusion of a rectifier circuit, according to the present invention.

FIGS. 4 and 5 illustrate the basic difference between a shearography system of the prior art and that of the present invention. In a system of the prior art, represented by FIG. 4, a video signal, containing a shearogram, is passed through analog-to-digital converter 31, and then either into buffer 33 or buffer 35. It is understood that an appropriate control circuit, not shown in FIG. 4, channels the output of converter 31 into one of the buffers 33 and 35. The contents of the buffers are converted to analog signals, by converters 37 and 39. These analog signals are compared, such as by direct subtraction, by operational amplifier 41. The resulting signal is amplified by amplifier 43, and drives a video monitor.

The arrangement of FIG. 5 is similar to that of FIG. 4, with the exception that rectifier 45 is inserted between the last two amplifiers. The rectifier thus receives the subtracted (or otherwise compared) video signal, as its input, and passes a signal to the final amplifier which drives the video monitor.

Figure 2:
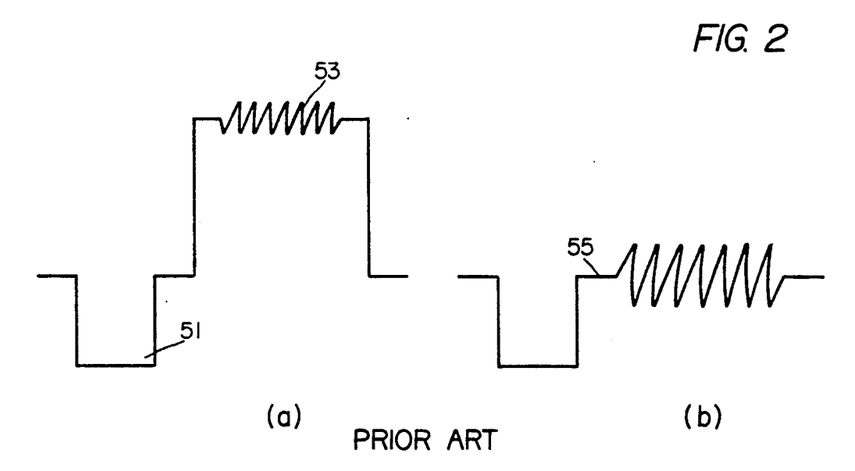
FIGS. 2a and 2b are diagrams of a video signal, obtained by electronic shearography, before and after amplification according to the techniques of the prior art.
Figure 3:
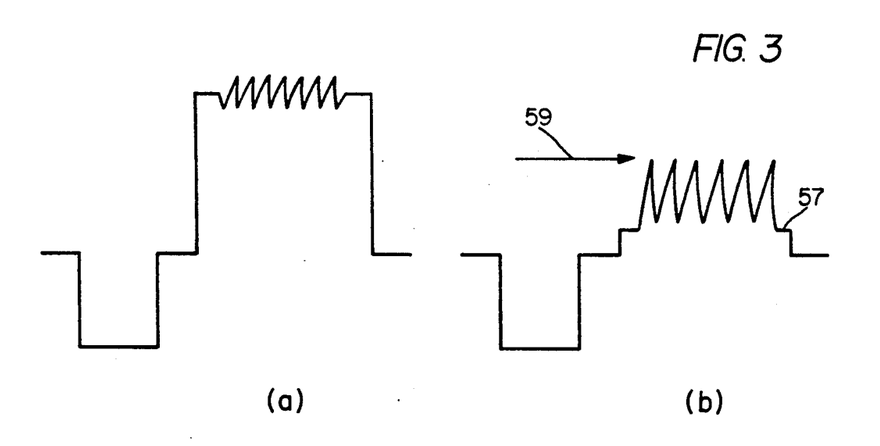
FIGS. 3a and 3b are diagrams similar to those of FIG. 2, but showing the effect of the use of the present invention.

The operations of the circuits shown in FIGS. 4 and 5 are represented by the diagrams of FIGS. 2 and 3, respectively. FIG. 2(a) illustrates a typical video signal resulting from the subtraction of two shearograms by amplifier 41. This signal includes sync (video synchronization) pulse 51 and the actual video signal 53. Because signal 53 represents a comparison of two images that are, in general, very similar, the amplitude of the variations of signal 53 is normally very small.

When the signal 53 is amplified by amplifier 43, the result is effectively what is shown in FIG. 2(b). Because the black level is assumed to be set at approximately the level indicated by reference numeral 55, the portion of the signal which goes below the black level is lost. Only that part of the signal which extends above the black level will result in a visible pixel. Thus, the quality of the image is relatively poor, as approximately half of the information in the video signal is discarded.

The problem described above cannot be solved simply by moving the black level downward. The variations comprising signal 53 originate from small phase changes due to deformation of the object. These phase changes can be either positive or negative. If one designated the lowest value of signal 53 as "black", the resulting image would be difficult to interpret, since the condition representing "no change" would appear not as black, but as halfway between black and white. An image in which the points of "no change" appear as black is much easier to interpret. The present invention achieves the latter result, while preserving the full dynamic range, i.e. wherein the changes in the video signal can range from full black to full white.

FIG. 3 shows the effect of the circuit of the present invention. FIG. 3(a) represents the subtracted video signal, similar to that of FIG. 2(a). However, in this case, the subtracted signal is fed to rectifier 45. FIG. 3(b) shows the output of the amplifier which follows the rectifier. Reference numeral 57 denotes the "black" level, and arrow 59 denotes the full "white" level. Note, therefore, that both the positive-going and negative-going changes in the subtracted video signal produce signals within the region between black and white. The signal is black only when the subtracted signal is zero, i.e. when there is no change, at the given pixel, between the shearograms being compared. Thus, all of the changes in the image, due to deformation of the test object, can be observed in the resulting display; none of the data are lost.

Figure 6:
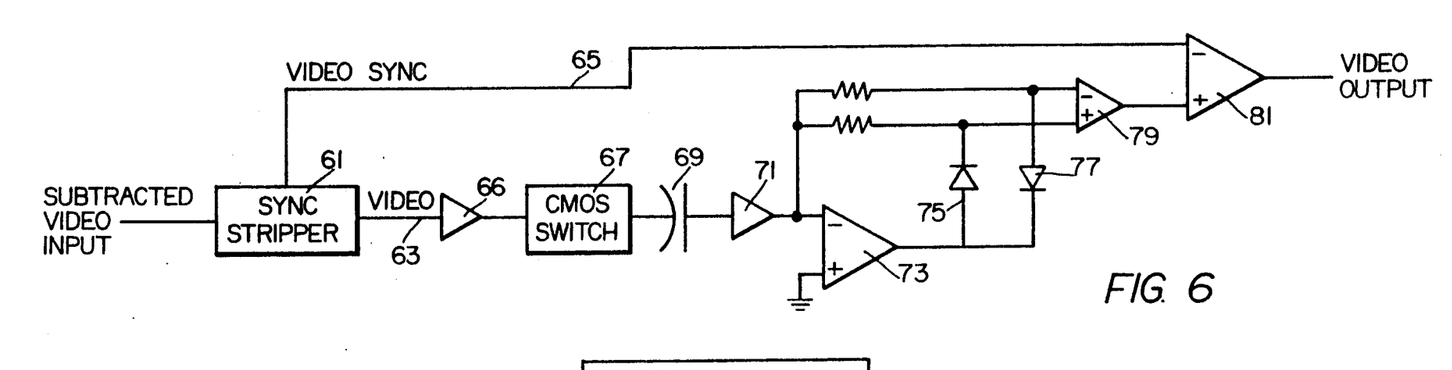
FIG. 6 is a schematic and block diagram showing an analog rectifier circuit according to the present invention.

FIG. 6 is a schematic and block diagram of a rectifier circuit according to one embodiment of the invention. The circuit of FIG. 6 comprises an analog implementation of the invention. This circuit is what is represented by block 45 in FIG. 5.

In the circuit of FIG. 6, the subtracted video signal is applied to sync stripper 61. The sync stripper is essentially an electronic switch which directs output to line 63 during the video portion of the signal, and which directs output to line 65 during the sync portion of the signal. Thus, sync stripper 61 resolves the incoming signal into two signals, one containing only the video information and the other containing only the sync pulses. A conventional timing and control circuit is assumed to be part of the sync stripper, and is not explicitly shown.

The video output on line 63 is connected to amplifier 66. The video signal normally needs amplification because it represents the subtraction (or other comparison) of two signals which comprise images of the same object, and are usually very similar. Thus, the amplitude of the video signal is usually very small.

The amplified signal is connected to CMOS switch 67. The CMOS switch is closed during the time that the video signal is present, and is open during the time when the sync pulse would have been present (if it had not been removed). The purpose of this switch is to eliminate the electrical noise or transients which may be introduced by the stripper circuit. The switch can comprise one or more CMOS transistors or equivalent. A conventional timing and control circuit, similar to, or the same as, that which controls the stripper, is also included to operate the CMOS switch, and is not explicitly shown.

The CMOS switch can be omitted. It is only necessary where the sync stripper generates significant amount of noise. Thus, the CMOS switch is not essential to the basic operation of the invention.

The resulting signal is ac-coupled, such as by capacitor 69, to amplifier 71. The capacitor eliminates any dc component in the signal.

The signal is then connected to the components which perform the actual rectification. Operational amplifier 73 receives the amplified video signal, and the output of this amplifier is connected in parallel to diodes 75 and 77, which have opposite polarities. The outputs of the diodes are combined in amplifier 79, which functions as an adder. The output of amplifier 79 is thus a rectified signal. The latter statement is true because, when the signal applied to amplifier 73 is positive-going, one of the diodes conducts and the other is cut off, and when the signal is negative-going, the other diode conducts and the first one is cut off. Thus, amplifier 79 receives an input every time there is a change, either positive or negative, in the video signal.

The output of amplifier 79 is recombined with the sync pulses, in amplifier 81, to produce a signal that can be used to drive the video monitor.

Figure 7:
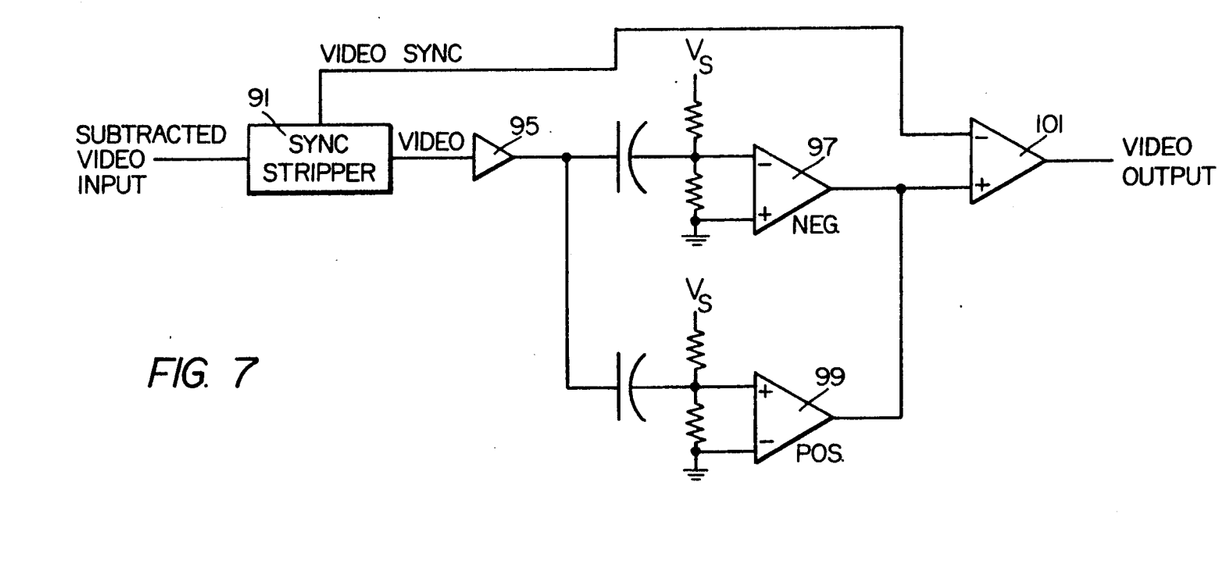
FIG. 7 is a schematic and block diagram showing a digital rectifier circuit according to another embodiment of the present invention.

FIG. 7 illustrates another embodiment of the invention, wherein the rectification is performed with another analog circuit having a binary output. As in the embodiment of FIG. 6, the subtracted video signal is separated from the sync pulses by stripper 91, and is amplified by amplifier 95. The resulting signal is then ac-coupled, in parallel, to comparators 97 and 99. The comparators are configured such that any negative-going signal will generate a positive pulse in comparator 97 (labeled "NEG"), and will produce no output in comparator 99. Similarly, any positive-going signal will produce a positive pulse in comparator 99 (labeled "POS"), and yields no output in comparator 97. The comparators produce pulses of uniform amplitude, irrespective of the amplitude of the incoming signals. The outputs of the comparators 97 and 99 are combined with the sync signal, in amplifier 101, the output of which drives the video monitor.

The embodiment of FIG. 7 is useful when one needs a quick indication of the status of the test object, and when one is not particularly concerned about a fine-quality image. Such a technique is especially useful where the object is stressed acoustically or by direct mechanical vibration. On the other hand, the embodiment of FIG. 6 is more suitable if the object is stressed by vacuum or pressure. In the latter case, one can more accurately control the precise amount of stress applied to the object, and it is meaningful to seek more detailed information about the condition of the object.

Figure 8:
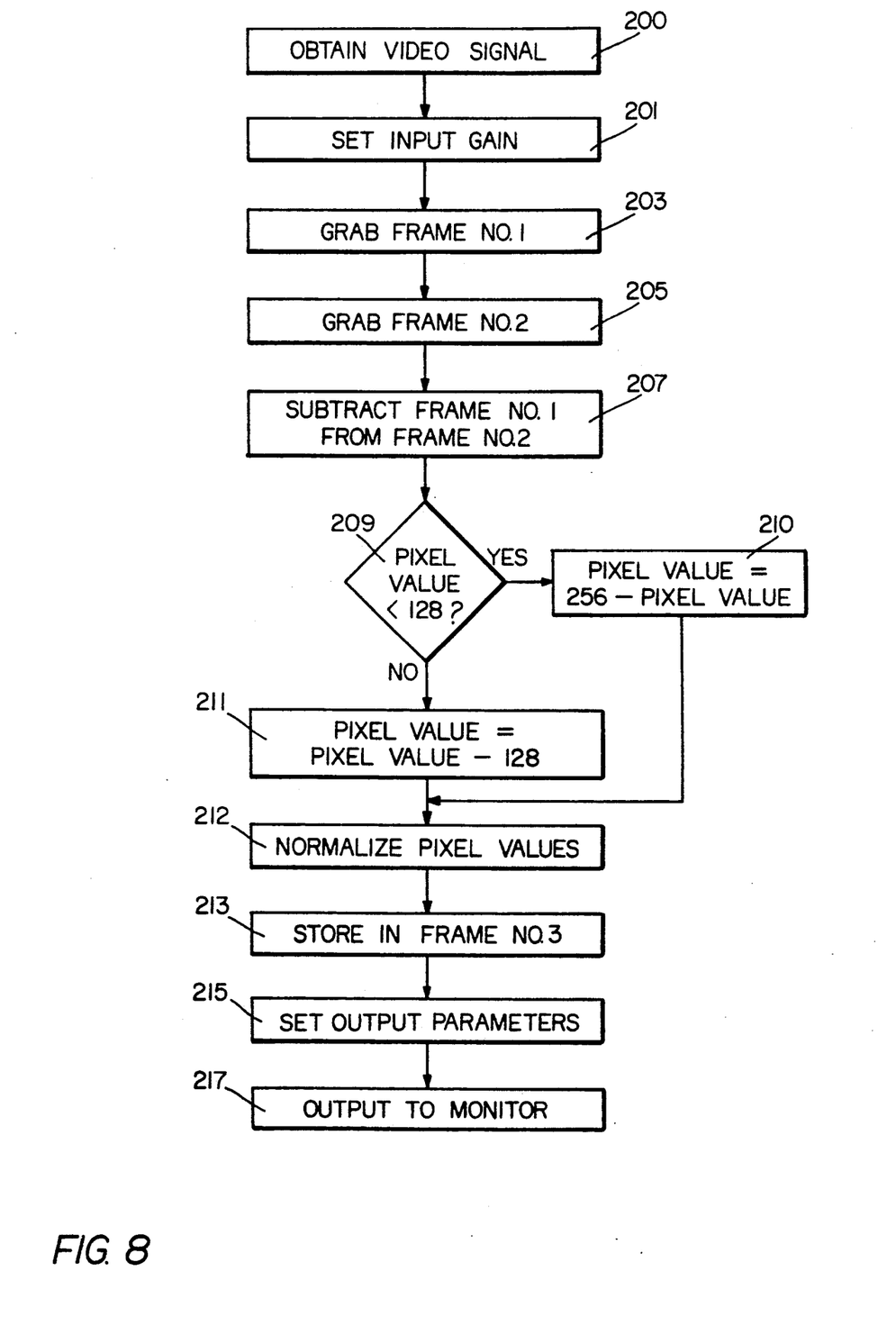
FIG. 8 is a flow chart illustrating the implementation of the present invention in software.

Both the embodiments of FIG. 6 and FIG. 7 can be implemented in software. FIG. 8 is a flow chart illustrating the essential steps of such software. The system starts by obtaining the analog video signal, in block 200. The latter step is not part of the software, but represents the interface between analog and digital portions of the system. The system sets the input gain in block 201. The gain is determined by the value of a variable in the program. This step can be made part of the software, or it can be an analog control.

Next, the program "grabs" the first frame, in block 203, and the second frame, in block 205. Blocks 203 and 205 therefore represent the digitizing steps. The video signal is typically digitized on a scale of zero to 256, with zero being black and 256 being white, although other digitizing schemes are possible.

In block 207, the program performs the subtraction. This is a pixel-by-pixel subtraction. Thus, if two corresponding pixels are equal, the result of the subtraction would be zero. However, the program adds 128 to the result of each subtraction, so that points of "no change" have the pixel value 128.

Each pixel is compared with 128, in test 209. If the pixel value is less than 128, the program sets the pixel value equal to 256 minus the pixel value, in block 210. If the pixel value is greater than or equal to 128, the program sets the pixel value equal to the pixel value minus 128, in block 211. It is understood that the operations represented by test 209, and blocks 210 or 211, are performed individually for all the pixels in the frame.

The pixel values are "normalized" in block 212. Block 212 represents a subroutine which determines the highest and lowest pixel values in the frame, and which sets these extreme values to 256 and zero, respectively. The normalization subroutine also adjusts the intermediate values according to the scale defined by the extreme values.

The normalized set of pixels is stored in a new frame, in block 213. The system sets various output parameters (such as output gain and/or color), in block 215, and also converts the data into an analog video signal. The result is connected to the video monitor, in block 217, the latter block representing an analog step.

In the software implementation shown in FIG. 8, the rectification of the subtracted video signal is performed by the procedure represented by test 209 and blocks 210 and 211.

The software technique has the advantage that it can be easily modified to obtain varying results. For example, the "gain" of the rectifier circuit, or other parameters such as DC offset, can be easily changed by setting a variable in a program. This advantage is particularly helpful in system development. On the other hand, typically the computer operating the program is not sufficiently fast, and the procedure of FIG. 8 will not operate in "real time". The latter disadvantage can be overcome by using faster or dedicated processors.

Of course, variations on the program shown in FIG. 8 are possible. The video signal can be digitized according to a different scale. The means of comparison of the frames can be other than simple subtraction. Also, the signal could be digitized after subtraction, instead of before the subtraction step.

Other modifications can be made in the analog and digital implementations. The present invention is not limited by the means of performing electronic shearography. Various circuit arrangements can be used to implement the rectifier shown in block 45 of FIG. 5. The particular arrangements of FIGS. 6 and 7 are intended to be exemplary, and not limiting. All of the above modifications are intended to be included within the spirit and scope of the following claims.

What is claimed is:

1. In an apparatus for performing electronic shearography, the apparatus including means for illuminating a test object with coherent radiation, means for producing an interference pattern from radiation reflected from the object, the interference pattern comprising the superposition of two laterally-displaced images of the object, means for generating a composite pattern from at least two of said interference patterns, and means for displaying said composite pattern, the displaying means being connected to receive a signal representing the composite pattern from the generating means, the improvement comprising rectifying means inserted between the composite pattern generating means and the displaying means, the rectifying means comprising means for causing both positive-going and negative-going variations in said signal to be converted into positive-going variations.

2. The improvement of claim 1, wherein the signal includes a video portion and a sync pulse portion, and wherein the rectifying means includes means for separating the video portion from the sync portion and for channeling the video and sync portions into different lines, means for rectifying the separated video signal, and means for combining the output of the video signal rectifying means with the sync pulse portion to produce a signal capable of driving the displaying means.

3. The improvement of claim 2, wherein the rectifying means includes at least one amplifier connected between the separating means and the video signal rectifying means.

4. The improvement of claim 3, wherein the video signal is accoupled to the video signal rectifying means.

5. The improvement of claim 4, further comprising a switching means connected to disable the video signal during predetermined time intervals, said intervals corresponding to the position in time of the sync pulse portion.

6. The improvement of claim 2, wherein the video signal rectifying means comprises an operational amplifier having its output connected in parallel to two diodes, the diodes being connected with mutually opposite polarities, the outputs of the diodes being connected to the inputs of an adder.

7. The improvement of claim 2, wherein the video signal rectifying means comprises means for generating a pulse whenever the video signal is positive or negative, and for generating no pulse when the video signal is zero.

8. The improvement of claim 7, wherein the rectifying means includes at least one amplifier connected between the separating means and the video signal rectifying means.

9. The improvement of claim 7, wherein the video signal is accoupled to the video signal rectifying means.

10. In a method for performing electronic shearography, the method including the steps of illuminating a test object with coherent radiation, producing an interference pattern from radiation reflected from the object, the interference pattern comprising the superposition of two laterally-displaced images of the object, generating a signal representing a composite pattern from at least two of said interference patterns, and displaying said composite pattern by feeding said signal to a display means, the improvement comprising the step of rectifying said signal, before the signal is fed to the display means, the rectifying step comprising the step of causing both positive-going and negative-going variations in said signal to be converted into positive-going variations.

11. The improvement of claim 10, wherein the signal includes a video portion and a sync pulse portion, and wherein the rectifying step includes separating the video portion from the sync portion and channeling the video and sync portions into different lines, rectifying the separated video signal, and combining the rectified video signal with the sync pulse portion to produce a signal capable of driving the display means.

12. The improvement of claim 11, wherein the rectifying step includes amplifying the video signal produced by the separating step before the video signal is applied to the video signal rectifying means.

13. The improvement of claim 12, further comprising the step of disabling the video signal during predetermined time intervals, said intervals corresponding to the position in time of the sync pulse portion.

14. The improvement of claim 11, wherein the video signal rectifying step comprises the steps of generating a pulse whenever the video signal is positive or negative, and generating no pulse when the video signal is zero.

15. The improvement of claim 14, wherein the rectifying step includes the step of amplifying the video signal before the video signal is applied to the video signal rectifying means.

16. In an apparatus for performing electronic shearography, the apparatus including means for illuminating a test object with coherent radiation, means for producing an interference pattern from radiation reflected from the object, the interference pattern comprising the superposition of two laterally-displaced images of the object, means for generating a composite pattern from at least two of said interference patterns, means for generating an analog signal representative of said composite pattern, and means for displaying said composite pattern,
the improvement comprising:

a) means for converting said analog signal into a digital signal.

b) programmable means for processing said digital signal, the programmable means being programmed to modify the digital signal by converting all changes in the digital signal, as measured from a reference value, into changes which are positive-going relative to the reference value, and c) means for converting the modified digitized signal into an analog signal capable of driving said displaying means, the latter converting means having an output which is connected to the displaying means.

17. In a method for performing electronic shearography, the method including the steps of illuminating a test object with coherent radiation, producing an interference pattern from radiation reflected from the object, the interference pattern comprising the superposition of two laterally-displaced images of the object, and generating an analog signal representing a composite pattern from at least two of said interference patterns,
the improvement comprising the steps of:

a) converting said analog signal into a digital signal, b) modifying said digital signal by converting all changes in said digital signal, as measured from a reference value, into changes which are positive-going relative to the reference value, and c) converting the modified digital signal into an analog signal capable of driving a display means.

* * * * *